July 30, 1957 J. M. NORMAN ET AL 2,800,893
RECEPTACLE AND STAND FOR RATION KIT
Filed Jan. 19, 1953 3 Sheets-Sheet 1

INVENTORS
John Marius Norman
Ole-Jacob Boe
Per Meidell
BY
ATTORNEYS

July 30, 1957  J. M. NORMAN ET AL  2,800,893
RECEPTACLE AND STAND FOR RATION KIT
Filed Jan. 19, 1953  3 Sheets-Sheet 2

INVENTORS
John Marius Norman
Ole-Jacob Boe
Per Meidell
BY
ATTORNEYS

July 30, 1957 J. M. NORMAN ET AL 2,800,893
RECEPTACLE AND STAND FOR RATION KIT
Filed Jan. 19, 1953 3 Sheets-Sheet 3
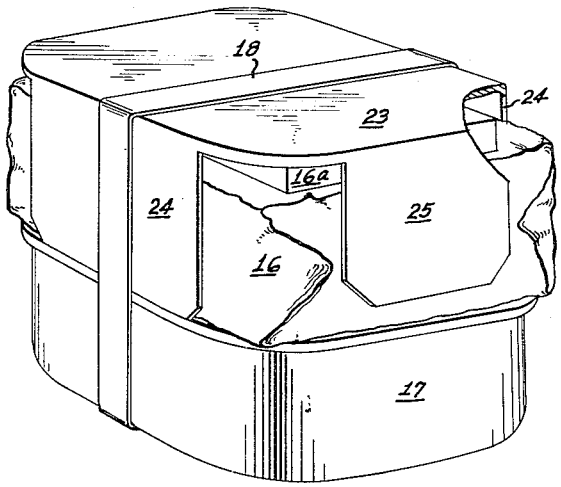
FIG. 10
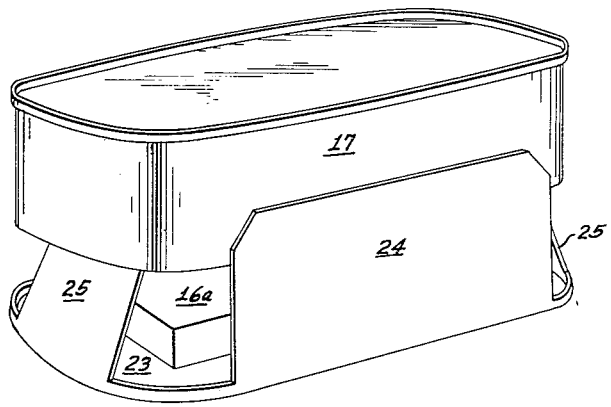
FIG. 11
FIG. 12
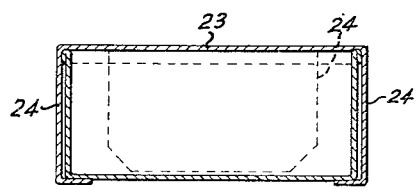
INVENTORS
John Marius Norman
Ole-Jacob Boe
Per Meidell
BY
ATTORNEYS

2,800,893

RECEPTACLE AND STAND FOR RATION KIT

John Marius Norman, Ole-Jacob Boe, and Per Meidell, Oslo, Norway, assignors to A/S Nordisk Aluminiumindustri, Oslo, Norway Application January 19, 1953, Serial No. 331,868

Claims priority, application Norway January 29, 1952

3 Claims. (Cl. 126—262)

This invention relates to ration kits and the like and, more particularly, to a novel ration kit embodying a novel receptacle for field rations and the like.

Emergency field rations for the armed services generally include a sealed can of foodstuff together with one or more packages of dried foodstuffs which do not require packaging in a hermetically sealed can. These foodstuff components are usually packaged in a paperboard or plastic receptacle, and much effort has been expended on the development of such receptacles which will withstand the mechanical abuse required in field service. Moreover, the contents of field ration packages proposed and developed heretofore could be heated prior to consumption only by the use of extraneous equipment.

We have now devised a field ration kit embodying a novel ration receptacle which may be constructed of light-weight sheet metal and which uses as its closure element the hermetically sealed can of foodstuff which is generally one of the components of the ration. The receptable of our invention further embodies a construction such as to permit its use in the field as a heating stand for the canned food component of the ration kit, and pursuant to a further embodiment of the invention the receptacle may serve as a temporary closure member for any food remaining in the open can. It will be appreciated, however, that our invention is not limited solely to the field of ration kits and that it includes kits of domestic items in which one item is advantageously packaged in a metal can or the like and in which the contents of the can or another item in the kit is such that it should be heated prior to use or consumption. Thus, although the novel kit and receptacle of our invention may be used for domestic purposes such as repair kits wherein a glue or cement supplied in the metal container should be heated prior to use, we shall for the sake of simplicity confine the following description of our invention to ration kits. It must be understood, however, that the term "ration" as used hereinafter and in the claims is merely illustrative and not restrictive of the goods which may be included in the kit in association with our novel receptacle.

The ration kit of our invention comprises a conventional hermetically sealed can of foodstuff and a novel receptacle for this can and any other package of foodstuff or heating fuel or other article which is to be included in the ration kit. The novel receptacle of our invention is made of sheet metal and comprises a substantially rectangular main body portion having dimensions substantially the same as the external dimensions of the metal ration container. The body portion of the receptacle is provided adjacent each of two opposite sides thereof with an upstanding side wall and is further provided adjacent each of the other two opposite sides thereof with an upstanding side wall of substantially lesser height than the first-mentioned side walls. The complete kit thus comprises the metal ration container positioned within the confines of the four side walls of the receptacle with a fastening element holding the container in position within the receptacle. Each of the four side walls is joined solely to the main body portion and the four side walls are not mutually interconnected except insofar as they may be brought into physical contact with one another. The side walls are thus capable of being independently manipulated.

The receptacle may be readily shaped from a blank either by hand at a packaging and distributing outpost or by machine at a central packaging plant. The receptacle blank comprises a substantially rectangular main body panel, a substantially T-shaped side wall panel integrally connected along the base of the T to each of two opposite sides of the main body panel, and a side wall panel integrally connected to each of the other two sides of the main body portion. The length of each of the T-shaped wall panels parallel to the base thereof, i. e. along the top of the T, is substantially equal to the combined length of the main body portion and the two other side wall panels.

These and other novel features of our invention will be more readily understood from the following description taken in conjunction with the drawings in which Fig. 1 shows the blank for the ration kit receptable;

Fig. 10 is a perspective view of a complete ration kit assembly embodying a modification of the receptacle of our invention;

Fig. 11 is a perspective view of the receptacle shown in Fig. 10 after being manually altered to support an opened metal ration container in a heating position; and Fig. 12 is a cross-sectional view of an assembly comprising an opened metal ration container having the receptacle of Fig. 10 positioned over its open top to serve as a cover therefor.

Figure 1:
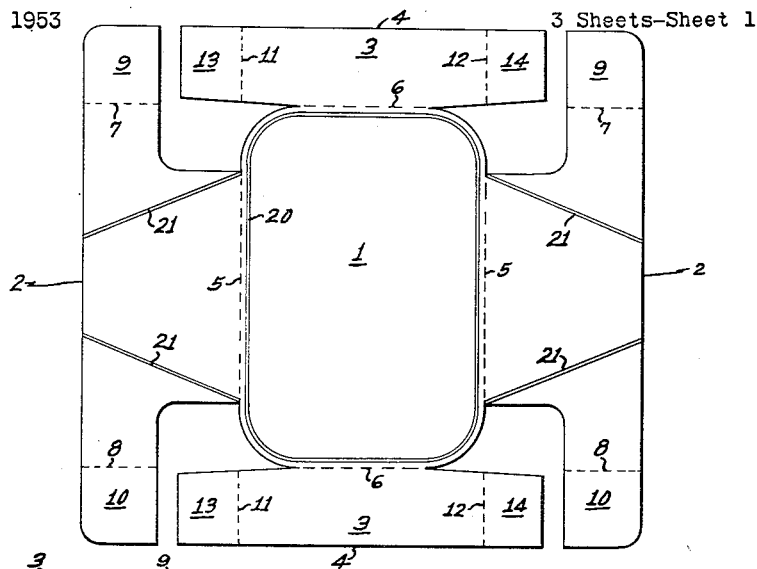

A sheet metal blank for the novel receptacle of our invention is shown in Fig. 1. This blank may be readily stamped out of sheet metal such as aluminum or other relatively lightweight and corrosion resistant metal. The blank comprises a central body panel 1 of generally rectangular shape. The dimensions of the main body panel are preferably substantially the same as the external dimensions of the metal ration container which is to be a component of the complete ration kit. The blank includes a substantially T-shaped side wall panel 2 adjoining each of two opposite sides of the main body panel, the base of the T being positioned adjacent the sides of the main body panel. The other two opposite sides of the main body panel are each provided with a side wall panel 3. The T-shaped side wall panels 2 are each of greater width than the other side wall panels 3 so that when these four panels are bent into an upstanding position the walls formed by the T-shaped panels 2 will be substantially higher than the walls formed by the other panels 3. The length of the T-shaped panels is preferably substantially equal to the distance between the distal edges 4 of the side wall panels 3, that is, the length of each of the T-shaped wall panels 2 parallel to the base thereof (score line 5) is substantially equal to the combined length of the main body portion 1 and the other two side wall panels 3.

Where the receptacle is to be formed by hand from the blank, the blank is advantageously provided with appropriately positioned score lines or the like to facilitate bending of the blank into the desired shape. For this purpose the blank is provided with score lines 5 at the junction between the main body panel 1 and the base of each T-shaped side panel 2 and with score lines 6 adjacent the other sides of the body panel and the smaller side wall panels 3. Each of the T-shaped side wall panels 2 is provided with score lines 7 and 8 across the arms of the T at a distance from one another equal to the length of the main body panel 1 in a direction parallel to the span of these arms and thus demarking wings 9 and 10 at the ends of the T. The smaller side wall panels 3 are similarly provided with score lines 11 and 12 spaced apart a distance substantially equal to the width of the main body panel 1 so as to demark wings 13 and 14 at the ends of these panels.

Figure 2:
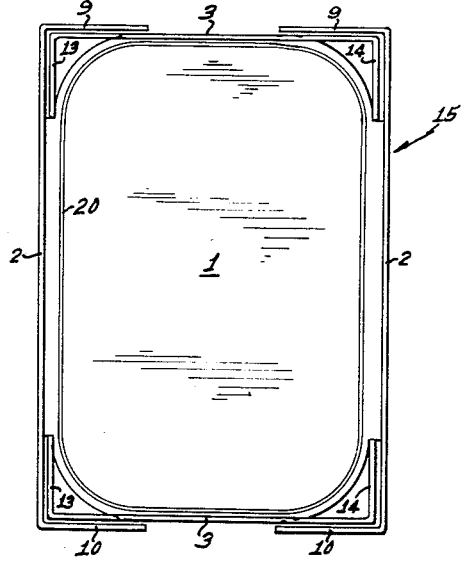
Fig. 2 is a plan view of the receptacle formed from the blank of Fig. 1.
Figure 3:
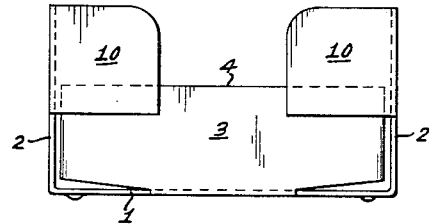
Fig. 3 is an end elevation of the receptacle shown in Fig. 2.

The sheet metal blank shown in Fig. 1 may be readily bent either by hand or by machine into the shape shown in Figs. 2 and 3. This is accomplished by first bending the wings 13 and 14 of the smaller end panels 3 about the score lines 11 and 12 into an upright position and by then similarly bending into an upright position the ends 9 and 10 of the arms of the T-shaped side wall panels 2 about the score lines 7 and 8. Each of the smaller end wall panels 3 is subsequently bent upwardly about the score line 6 and finally each of the T-shaped wall panels 2 is similarly bent upwardly into upright position about the score line 5. As can be clearly seen in Figs. 2 and 3, the wings 13 and 14 of the smaller side wall panels 3 are positioned within the confines of the side walls formed by the T-shaped panels 2 and the wings 9 and 10 of the T-shaped panels 2 embrace the outer portion of the receptacle walls formed by the smaller end wall panels. The resulting receptacle 15 comprising the main body portion 1 and the four wall sections 2 and 3 with their inwardly bent arms 9, 10, 13 and 14 is then ready to receive the similarly shaped metal ration container in assembly of the ration kit.

Figure 4:
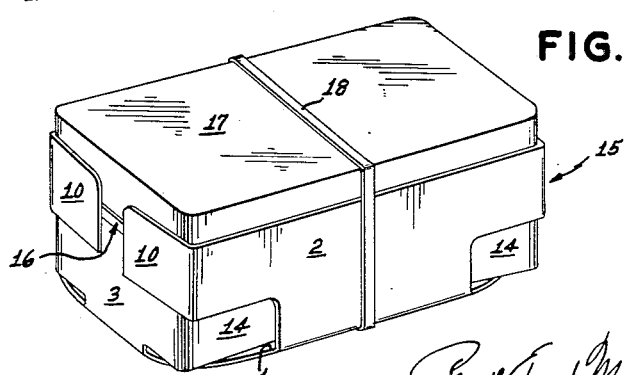
Fig. 4 is a perspective view of the completely assembled ration kit.

The assembly of the ration kit can be clearly seen by reference to Fig. 4. If the kit is to contain a package of foodstuff or other useful material in addition to the contents of the metal container, such package 16 is first positioned within the receptacle. The package may advantageously include a briquette of fuel or the like for use in subsequently heating the contents of the metal ration container. The final component of the ration kit assembly to be inserted into the receptacle is the metal ration container 17. By making the main body panel 1 of the receptacle blank of substantially the same dimensions as the outer dimensions of the metal ration container 17, the side walls 2 and 3 of the receptacle will firmly engage the outer walls of the metal ration container and will safely protect any other packaged material 16 positioned within the interior of the receptacle. The entire assembly may be held securely in position by a band of adhesive tape 18 or the like encircling the complete assembly.

Figure 5:
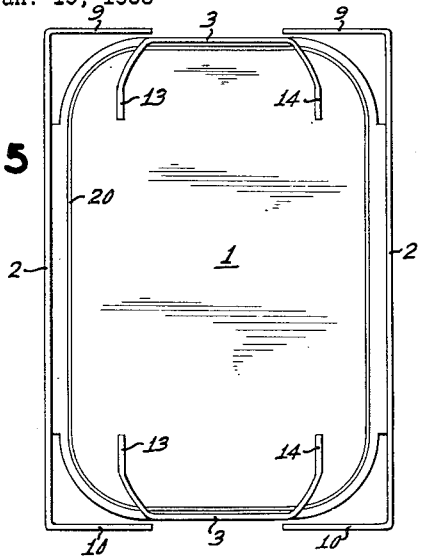
Fig. 5 is a plan view of the receptacle shown in Fig. 2 after being manuallly manipulated to form a heating stand.
Figure 6:
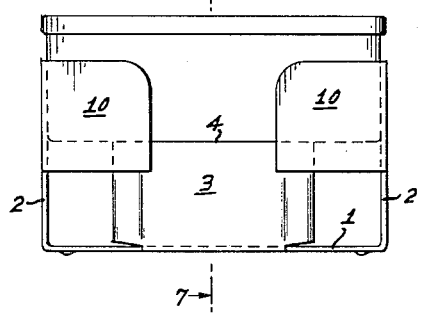
Fig. 6 is an end elevation of the receptacle in the form shown in Fig. 5 and showing the ration can in heating position thereon.
Figure 7:
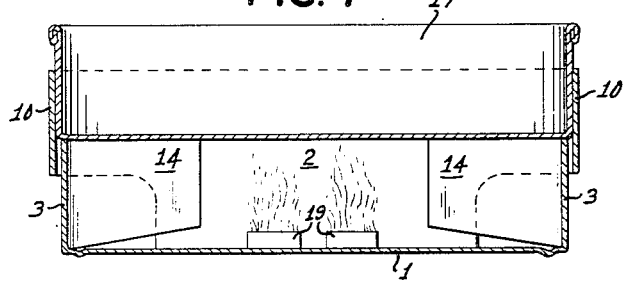
Fig. 7 is a sectional elevation taken along line 7–7 in Fig. 6.

When the ration kit is to be used, the tape 18 is removed and then the metal ration container 17 and any other packaged material 16 within the receptacle are removed from the receptacle. The metal ration container may be opened in any manner consistent with the construction of the container. If it is desired to heat the contents of the metal ration container or to heat some other material in this container, the receptacle 15 may be readily fashioned into a heating stand by manually bending the wings 13 and 14 of the shorter end wall panels 3 inwardly towards the opposite end walls 2 until the wings 13 and 14 assume the position shown in Figs. 5 and 6. The wings 13 and 14 will thus provide upright legs upon which the metal ration container 17 may be supported as shown in Fig. 7. It will be noted that the side walls 2 of the receptacle formed from the T-shaped side wall panels and the wing portions 9 and 10 thereof form a confining structure above the level of the supporting legs provided by the wings 13 and 14 of the lower side walls 3 so as to hold the metal ration container in position while it is being heated. The container contents may be heated by positioning therebelow, and on the upper surface of the main body panel 1 of the blank, the fuel briquettes 19 packaged in the kit or other fuel from an extraneous source. This fuel will burn freely by air supplied through the openings between the wings 9, 10, 13 and 14 adjacent the four corners of the receptacle but the flame from the fuel is protected against wind by the upstanding side wall panels 2 and 3.

Figure 8:
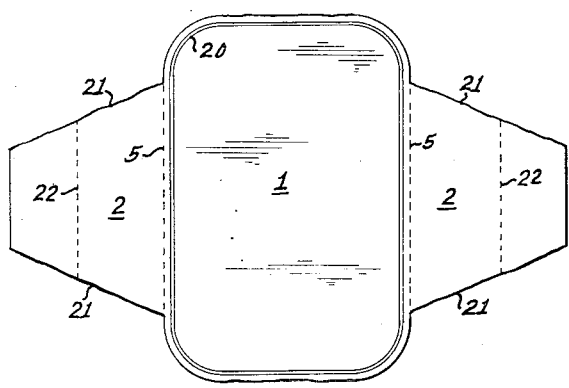
Fig. 8 is a plan view of the receptacle manually altered to form a cover for an opened metal ration container.
Figure 9:
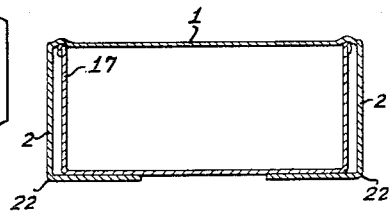
Fig. 9 is a cross-sectional view of an opened metal ration container having the receptacle placed in position as a cover therefor.

We have also found it advantageous to provide the receptacle blank with additional features which make it possible to use the receptacle as a cover for the metal ration container 17 in the event the user wishes to protect any residual foodstuff or the like within the container. These features include a trough-like indentation 20 in the main body panel 1 of the receptacle blank having exactly the configuration of the upper edge of the metal ration container 17. In addition, the receptacle blank may be provided with weakening lines 21 extending outwardly along each of the T-shaped side wall panels 2. Thus, after the receptacle has been used as a heating stand and is no longer required for this purpose, the extreme portions of the T-shaped end wall panels beyond the weakening lines 21 may be removed by flexing or bending these portions of the receptacle back and forth about the lines 21 until they break off. Similarly, each of the smaller end walls 3 of the receptacle may be bent a number of times about the score line 6 until these end walls are similarly removed. The resulting structure, as shown in Fig. 8, will comprise the main body panel 1 and that portion of each of the T-shaped side wall panels 2 between the weakening lines 21. This structure may be placed over the open metal ration container 17 with the trough-shaped indentation 20 engaging the upper edge of the container as shown in Fig. 9, and the vestiges of the T-shaped side wall panels 2 may be bent downwardly around the sides and bottom of the metal container. In order to facilitate the bending of the panels 2 around the bottom of the container 17, the blank may be further provided with score lines 22 each positioned from the proximate score line 5 by a distance substantially equal to the depth of the metal ration container.

The receptacle of our invention may also have a somewhat simpler form such as that shown in Fig. 10. This modification of our receptacle does not afford the complete enclosure of all lateral portions of the ration kit, as does the modification described hereinbefore, but it does afford a large measure of protection for the contents of the kit and may also be used as a heating stand and as a cover for the opened metal ratio container. As will be seen in Fig. 10, this simpler modification of our ration kit receptacle comprises a main body portion 23 having substantially the same dimensions as that of the metal ration container 17, and the main body portion is provided adjacent each of two opposite sides with relatively high side wall sections 24 and adjacent the other two opposite sides with side wall sections 25 of lesser height. The ration goods are assembled in the receptacle to form a kit in substantially the same manner as that described hereinbefore. Thus, packages of foodstuff 16, fuel 16a, or any other useful article, are first positioned within the receptacle and the open portion of the resulting structure is closed by the positioning thereover of the metal ration container 17. The final structure is held in this relationship by the band of adhesive tape 18 or the like encircling the assembled components. After the kit has been opened, the receptacle may be inverted as shown in Fig. 11, its side walls 25 of lesser height are bent inwardly, the fuel 16a is positioned on the main body portion 23 of the receptacle and the metal ration container 17 is placed on top of the upper ends of the inwardly sloping low side walls 25 and between the higher side walls 24. If anything is to be retained in the opened metal ration container for future use, the low side walls 25 which were previously bent inwardly may be restored to their original upright position and then the receptacle may be inverted and placed over the open metal ration container so that the side walls of the receptacle can be bent downwardly around the container as shown in Fig. 12.

It will be seen, accordingly, that the ration kit of our invention comprises a sheet metal receptacle provided with a main body portion and side wall portions and having an open end which is closed by the metal ration container which forms one component of the complete kit. The novel receptacle component of this kit not only affords a measure of mecahnical protection not obtainable with paperboard or plastic receptacles used heretofore but is also characterized by the additional utility of being adapted for use as a heating stand and as a cover for the metal ration container component of the kit.

We claim:

1. A sheet metal receptacle for a metal ration container and adapted to serve as a heating stand therefor which comprises a substantially rectangular main body portion, the main body portion of the receptacle being provided adjacent each of two opposite sides thereof with an upstanding T-shaped side wall section extending directly upwardly from the main body portion with the arms of each T bent inwardly toward the opposite T-shaped wall section and the main body portion being further provided adjacent each of the other two opposite sides thereof with an upstanding side wall section of substantially lesser height than the first-mentioned side walls but having lateral end portions bent inwardly toward the other similarly-shaped side wall section, each of the four side wall sections being joined solely to the main body portion and thus permitting independent manipulation of the inwardly-bent portions of each of the side walls of lesser height inwardly toward one another over the main body portion so as to serve as a support for a metal ration container above the level of the main body portion but within the confines of the side walls of greater height when the four side wall sections of the receptacle and the ration container have approximately the same corresponding side dimensions.

2. A sheet metal receptacle as claimed in claim 1, in which the lower edges of the bent-in arms of the T-shaped side wall sections overlap the upper portion of the other side wall sections of lesser height.

3. A sheet metal receptacle as claimed in claim 1, in which the bases of said T-shaped side wall sections are substantially shorter than the sides of the main body portion on which they are respectively provided, whereby the arms and stems of the T-shaped side wall sections in part define an opening between the main body portion and the arms of the T-shaped side wall sections at each corner of the main body portion.

References Cited in the file of this patent

UNITED STATES PATENTS

| | | |
|---|---|---|
| 1,096,118 | Myers | May 12, 1914 |
| 1,358,495 | Aronson | Nov. 9, 1920 |
| 1,844,066 | Hughes | Feb. 9, 1932 |
| 2,155,871 | Piker | Apr. 25, 1939 |
| 2,373,611 | Steven | Apr. 10, 1945 |
| 2,424,716 | Smart | July 29, 1947 |
| 2,568,204 | Reeser | Sept. 18, 1951 |

FOREIGN PATENTS

| | | |
|---|---|---|
| 325,044 | France | Dec. 31, 1902 |